United States Patent
Quintero Cantero et al.

(10) Patent No.: US 10,320,774 B2
(45) Date of Patent: Jun. 11, 2019

(54) METHOD AND SYSTEM FOR ISSUING AND USING DERIVED CREDENTIALS

(71) Applicant: Route1 Inc., Toronto (CA)

(72) Inventors: Yamian Quintero Cantero, Boca Raton, FL (US); Jerry S. Iwanski, Toronto (CA)

(73) Assignee: ROUTE1 INC., Toronto (CA)

( * ) Notice: Subject to any disclaimer, the term of this patent is extended or adjusted under 35 U.S.C. 154(b) by 282 days.

(21) Appl. No.: 15/230,044

(22) Filed: Aug. 5, 2016

(65) Prior Publication Data
US 2018/0041494 A1 Feb. 8, 2018

(51) Int. Cl.
| | | |
|---|---|---|
| H04L 29/06 | (2006.01) | |
| H04L 9/06 | (2006.01) | |
| H04W 12/04 | (2009.01) | |
| H04W 12/06 | (2009.01) | |
| G06F 21/31 | (2013.01) | |

(52) U.S. Cl.
CPC .......... *H04L 63/083* (2013.01); *H04L 9/0618* (2013.01); *H04L 63/06* (2013.01); *H04L 63/0823* (2013.01); *H04W 12/04* (2013.01); *H04W 12/06* (2013.01); *G06F 21/31* (2013.01)

(58) Field of Classification Search
CPC ....... H04L 63/08; H04L 63/083; H04L 63/06; H04L 63/0823; H04L 9/061; H04W 12/04; H04W 12/06; G06F 21/21; G06F 21/72; G06F 21/10; G06F 21/31; G06F 21/6218

See application file for complete search history.

(56) References Cited

U.S. PATENT DOCUMENTS

| | | | |
|---|---|---|---|
| 9,197,422 B2* | 11/2015 | Irwin | H04L 9/0877 |
| 9,780,950 B1* | 10/2017 | Dundas | H04L 63/0838 |
| 9,881,348 B2* | 1/2018 | Hughes | G06Q 30/06 |
| 2005/0114712 A1* | 5/2005 | Devine | G06F 11/0709 726/4 |
| 2017/0310698 A1* | 10/2017 | Klemm | H04L 63/1441 |

FOREIGN PATENT DOCUMENTS

WO  WO-2017039156 A1 *  3/2017  ............. G06F 21/31

* cited by examiner

*Primary Examiner* — Khalil Naghdali
*Assistant Examiner* — Shaqueal D Wade
(74) *Attorney, Agent, or Firm* — Muncy, Geissler, Olds & Lowe, P.C.; Daniel Podhajny (57) ABSTRACT

At a mobile device, a password is used to create a proof of knowledge (POK). The POK is stored in a controller accessible via a communication network. The POK ensures that the controller can detect an incorrect password from the mobile device, and that the mobile device cannot be subject to a brute force attack to determine the DC stored in the mobile device. After a predetermined number of unsuccessful attempts to enter the password, the controller blocks further attempts, thereby restoring protection against a brute force attack that was lost going from a standalone smart card to mobile-device-based derived credentials. A portion of Derived Credentials, needed to authenticate the user of a mobile device, is stored in the controller, further increasing the difficulty of unauthorized use.

20 Claims, 9 Drawing Sheets

METHOD AND SYSTEM FOR ISSUING AND USING DERIVED CREDENTIALS

BACKGROUND OF THE INVENTION

The present invention relates to improving security for a mobile device using a host computer system, improving identity and access management for a mobile device, and improving user authentication for a mobile device.

Computer security is improved by requiring potential users to provide so-called "two factor authentication": two components to prove the user's identity. Typically, the first factor is something that the user knows, such as a password, while the second factor is something that the user has, such as a magnetic stripe card or a "smart card" that includes a computer chip, sometimes referred to as a personal identity verification (PIV) card or common access card (CAC). However, when a user uses a mobile device to access a computer system, such as a smartphone, there are difficulties in using a card, as mobile phones are generally unable to read magnetic stripe cards or smart cards, and it is undesirable to require that a user carry an external card reader device.

In mobile telephony, an integrated chip that stores the subscriber's identity is referred to as a subscriber identity module (SIM) chip, designed to be transferred between mobile devices. The SIM circuit is part of a universal integrated circuit card (UICC) physical smart card. A SIM card contains its unique serial number (ICCID), international mobile subscriber identity (IMSI) number, security authentication and ciphering information, temporary information related to the local network, a list of the services the user has access to, and two passwords: a personal identification number (PIN) for ordinary use, and a personal unblocking code (PUC)—sometimes referred to as a pin unlocking key (PUK)—for PIN unlocking.

The National Institute of Standards and Technology (NIST), responding to a directive for a common identification standard to promote interoperable authentication mechanisms at graduated levels of security based on the environment and the sensitivity of data, coined the term "derived credentials" (DC), later updated to "derived PIV credentials" (DPC), to refer to cryptographic credentials that are derived from those in a PIV or CAC and carried in a mobile device instead of the card. Thus, DC are a "soft token" carried on the mobile device itself. The mobile device becomes the second factor: what you have. The first factor, what you know, is the password that the user provides to unlock the soft token. Then, the soft token uses its stored DC value to verify the user's identity, such as by querying a Certificate Authority to ensure that the user's credential value is still valid. DC improve mobile authentication via mobile devices with the levels of security demanded by government agencies.

NIST Special Publication 800-157 allows a user to request their DC using their PIV smartcard instead of a face-to-face identity verification, up to Level of Assurance (LOA) 3. On typical smartphones, there are four storage options for the DC: (i) native key store in non-volatile memory, (ii) MicroSD card, (iii) UICC/SIM card, and (iv) embedded within software.

A DC management system must control the issuance, maintenance and revocation of mobile credentials in a simple and secure manner, allowing large organizations to scale to enterprise-wide deployment. Examples of DC management systems are: (a) MyID from Intercede, (b) IdExchange from CyberArmed, (c) Entrust Identity Guard from Entrust DataCard, (d) Digital Authentication Framework with MyID Authenticator from Good Technology, and (e) Unified Credential Management System from SecuEra Cryptovision.

There is room for improvement in DC management systems.

SUMMARY OF THE INVENTION

In accordance with an aspect of this invention, there is provided a method of obtaining access to a host server. A mobile device sends, to a controller via a communication network, a proof of knowledge based on a password newly received from a user. The controller receives the proof of knowledge from the mobile device, and checks whether the received proof of knowledge matches a stored proof of knowledge. When a match occurs, the controller sends a kibble to the mobile device via the communication network. When a match does not occur, the controller checks whether an access attempts threshold has been reached. When the access attempts threshold has been reached, the controller sends a message to the mobile device via the communication network denying access. When the access attempts threshold has not been reached, the controller sends a message to the mobile device via the communication network inviting sending of a new proof of knowledge. The mobile device receives the kibble from the controller, uses the received kibble to recover a private key of derived credentials, and sends the derived credentials security certificate to the host server via the communication network.

In accordance with another aspect of this invention, there is provided a controller for improving access security of a host server accessed by a mobile device. The controller includes a communication interface, a storage and a processor. The communication interface is for using a communication network. The storage is for storing an access attempts counter, a kibble of a private key of derived credentials, an access attempts threshold, and a proof of knowledge. The processor is for receiving the proof of knowledge from the mobile device via the communication network, and checking whether the received proof of knowledge matches a stored proof of knowledge. When a match occurs, the controller sends the kibble to the mobile device via the communication network. When a match does not occur, the controller checks whether the access attempts threshold has been reached by the access attempts counter. When the access attempts threshold has been reached, the controller sends a message to the mobile device via the communication network denying access. When the access attempts threshold has not been reached, the controller sends a message to the mobile device via the communication network inviting sending of a new proof of knowledge.

In accordance with a further aspect of this invention, there is provided a mobile device for using a controller to improve access security to a host server. The mobile device includes a communication interface, a storage and a processor. The communication interface is for using a communication network. The storage is for storing a derived credentials security certificate, and a first kibble of a private key for the derived credentials. The processor is for sending to the controller via the communication network, a proof of knowledge based on a password newly received from a user; receiving from the controller via the communication network, a second kibble of the private key; using the received second kibble and the stored first kibble to recover a private key of the derived credentials; and sending the derived credentials security certificate to the host server via the communication network.

It is not intended that the invention be summarized here in its entirety. Rather, further features, aspects and advantages of the invention are set forth in or are apparent from the following description and drawings.

DETAILED DESCRIPTION

An advantage of a smart card is that, after a user attempting to enter a personal identity number (PIN), also referred to as a password, enters a predetermined number of invalid PINs, the smart card will block further attempts, thereby blocking a brute force attack.

A problem with existing DC management systems is that DC are stored entirely within the mobile device, and so protection against a brute force attack is lost. Specifically, since the DC are in the mobile device which is entirely under the control of the user, a determined unauthorized user can apply an actual brute force attack, or a workaround such as the government uses with Apple mobile phones, to recover information stored entirely in the mobile device.

As used herein and in the claims, "derived credentials" (DC) comprise (i) a security certificate including a public key, and (ii) a corresponding private key. DC are used in various ways, such as to validate the identity of a user. The present invention splits the DC private key into two parts, referred to as kibbles: one kibble is stored in a mobile device, while the other kibble is stored at a controller accessible via a communication network. Splitting the DC private key means that even if an attacker obtains the remote device, the attacker can still be prevented from masquerading as the proper user of the remote device.

Management credentials (MC) similarly comprise (i) a security certificate including a public key, and (ii) a corresponding private key. MC are used to establish a secure communication channel between the user's mobile device and the controller via the communication network.

The DC private key and the MC private key are generated by the mobile device, and never leave the mobile device. Thus, an eavesdropper of messages transmitted to and from the mobile device cannot obtain the DC and MC private keys.

The present invention uses a user password (UP) to create a derived credentials encryption key (DCEK) for encrypting DC prior to storage in a mobile device, a management credentials encryption key (MCEK) for encrypting MC prior to storage in the mobile device, and a proof of knowledge (POK). The POK is sent from the mobile device to the controller, is stored in the controller, and is used by the controller to detect an incorrect password. The mobile device cannot be subject to a brute force attack to determine the DC because after a predetermined number of unsuccessful attempts to enter the password, the controller blocks further attempts, thereby restoring protection against a brute force attack that was lost going from a standalone smart card to mobile-device-based DC. The two-factor authentication is based on what you know, your password, and what you have, a mobile device with stored information and a program to convert the stored information into values that match values stored at the controller.

An advantage of the present invention is that the controller improves security, as it re-introduces protection against a brute force attack present with a smart card even when a mobile device is used without a smart card.

Configuration

Figure 1:
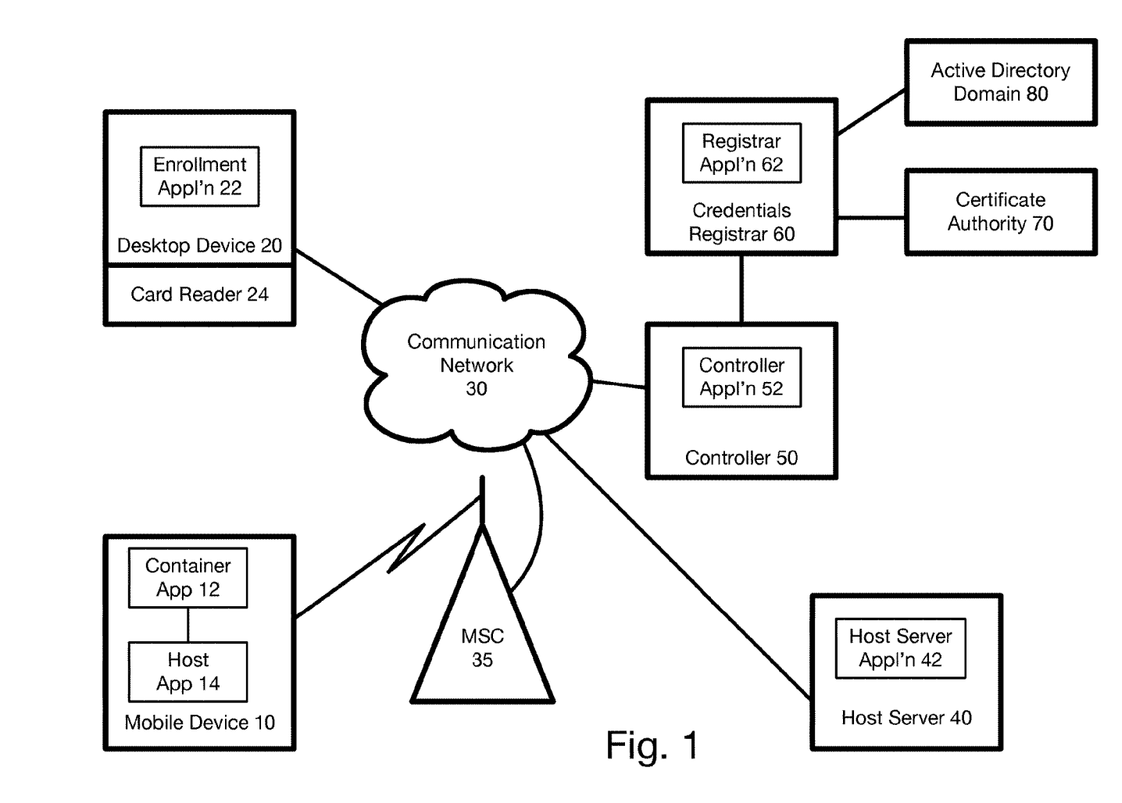
FIG. 1 is a block diagram showing a hardware and communications configuration.

FIG. 1 is a block diagram showing a hardware and communications configuration. The hardware components include mobile device 10, desktop device 20, communication network 30, mobile switching center (MSC) 35, host server 40, controller 50, registrar 60, certificate authority 70 and active directory domain server 80. Each of these hardware components comprises one or more general purpose computers with appropriate processors, operating systems, memory, storage and communication interfaces to operate as discussed below.

A convention used herein is that a software application program executing on a mobile device is referred to as an "app", while a software application program executing elsewhere is referred to as an "application".

Mobile device 10 is a portable, typically hand-held general purpose computer device, such as a smartphone or tablet, or even a laptop computer, and is carried by a user who needs to access data, one or more software programs and/or other resources available on host server 40 or other hosts.

Mobile device 10 executes container app 12 and at least one host app 14; each of container app 12 and host app 14 are respective software programs that provide a interface, typically a graphical user interface (GUI), for receiving data from the user and displaying data to the user. Mobile device 10 sends and receives data via a wireless connection to MSC 35. In other embodiments, mobile device 10 wirelessly sends and receives data to a local network, such as a WiFi network, that in turn sends data to communication network 30. Other communications configurations are possible for mobile device 10. Typically, there are multiple instances of mobile device 10.

Mobile device 10 stores, on behalf of its proper user, the MCEK, the encrypted MC, the private key for the MC, the DCEK and for each of the DC instances, the encrypted DC and one of the encrypted kibbles for the private key of the DC. Because the other kibble for the private key of the DC is stored in controller 50, mobile device 10 must request the other kibble from the controller prior to using the DC. Thus, even if the proper user of mobile device 10 loses mobile device 10, the DC for the user are not compromised.

Container app 12 functions to interact with controller 50, and provides a secure (encrypted) communication channel for retrieving the kibble of the DC private key stored in controller 50. Container app 12 is used to manage the life cycle of the DC. Container app 12 also functions to provide an application programming interface (API) for secure communications to host app 14. Two API embodiments are described below; others are possible. In the first embodiment, container app 12 provides the DC directly to host app 14. In the second embodiment, host app 14 provides to container app 12 its own cleartext messages and encrypted messages from host server 40, and host app 14 receives from container 12 digitally signed versions of its own messages and cleartext versions of messages from host server 40. The second embodiment advantageously prevents the DC private key from being exposed outside of container app 12.

Table 1 shows a partial concordance of the data used by container app 12.

TABLE 1

| Data | Step Created | Step Stored | Step Used |
|---|---|---|---|
| Activation Code AC | 112 | Not stored | 120 |
| Derived Credentials DC | | | |
| DC security certificate | 270 | 280 (encrypted) | 470, 650, 485 |
| DC credential request P10_DC_n | 180 | Not stored | 225 |
| DCEK | 127 | Not stored | 190, 275, 655 |
| DCn_private | 175 | Not stored | 225, 470, 485 |
| DCn_private kibble1 | 180 (365) | 280 (encrypted) | 655, 665 |
| DCn_private kibble2 | 180 (365) | Not stored | 215, 445, 665 |
| DCn_public | 175 | In DC certif. | 225, 650, 485 |
| Mask | 180 | 360 | 365, 665 |
| Management Credentials MC | | | |
| MC security certificate | 155 | 165 (encrypted) | 200, 430 |
| MC credential request P10_MC | 130 | Not stored | 130 |
| MCEK | 127 | Not stored | 160, 200, 430 |
| MC_private | 115 | 165 (encrypted) | 130, 200, 430 |
| MC_public | 115 | In MC certif. | 130, 200, 430 |
| Proof of Knowledge POK | 127 | Not stored | 130, 445 |
| Salt S | 127 | 305 | 310, 600, 605 |
| User password UP | 112, 410, 522 | Not stored | 185, 310, 605 |

Host app 14 functions to interact with one or more instances of host server 40. Host app 14 used the API exposed by container app 12 to perform authentication using credentials contained in container app 12. In some embodiments, mobile device 10 executes multiple instances of host app 14, corresponding to multiple instances of host server 40. It is desirable to protect host app 14 against a brute force attack, wherein an unauthorized user tries every possible combination until they find a password. The present invention helps protect host app 14 against brute force attacks by denying security credentials to unauthorized users of mobile device 10.

Desktop device 20 is a general purpose computer used only during a set-up phase, to provide credentials to a user. Desktop device 20 executes enrollment application 22. In some embodiments, desktop device 20 is portable computer. Desktop device 20 sends and receives data via a wireline connection to communication network 30. In other embodiments, other communications configurations are possible for desktop device 20. Desktop device 20 includes card reader 24, such as a Chip/smart Card Interface Device (CCID) reader, to collect information from a user's smart card. In some embodiment, desktop device 20 is incorporated in controller 50.

Enrollment application 22 captures relevant credential information from the user's smart card and provides the captured information to controller 50 to obtain an activation code that is later used by container app 12 to derive credentials for the user. In one embodiment, enrollment application 22 is a Microsoft WINDOWS program that prompts the user to insert a smart card, asks the user for a PIN, then presents the user with an Activation Code. Details of the operation of enrollment application 22 are discussed below with regard to the flowcharts.

Communication network 30 enables devices 10, 20, 40 and 50 to send data messages, typically in the form of data packets, across unsecured electronic channels, i.e., unpermitted eavesdroppers may have access to the data messages. The Internet is an instance of communication network 30.

MSC 35 functions to provide a wireless communication channel to mobile device 10, and to transmit data messages to/from mobile device 10 via communication network 30. As mentioned, in some embodiments, a local wireless network substitutes for MSC 35.

Host server 40 is a general purpose computer that executes one or more host server application programs 42 used by one or more users of mobile device(s) 10. Typically, there are multiple instances of host server 40.

Controller 50 is a general purpose computer that executes controller application 52, which operates as described below. Controller 50 stores information about the user, including the following values associated with the user: the proof of knowledge (POK), the MC, the DC and a kibble for the private key associated with each DC.

Table 2 shows a partial concordance of the data used by controller application 52.

TABLE 2

| Data | Step Stored | Step Used |
|---|---|---|
| AC | 105 | 125 |
| AttemptsCtr | 265 | 455, 500, 505 |
| DC security certificate | 260 | 260 |
| DCn_private kibble2 | 220 | 460 |
| MaxTries | 100 | 455 |
| PIV | 105 | Various |
| MC security certificate | 145 | 210, 435 |
| POK | 145 | 450 |

In one embodiment, controller 50 is operated by a different entity than the operator of host server 40, and controller 50 is at a different location than the location of host server 40. In other embodiments, the operator of controller 50 and host server 40 may be the same or different, and the location of controller 50 and host server 40 may be the same or different.

Registrar 60 is a general purpose computer that executes registrar application 62 that, as described below, receives requests for new security certificates from controller 50, interacts with certificate authority 70 to obtain the new certificates, and communicates with active directory domain server to publish new certificates signed by certificate authority 70.

Certificate authority 70 is a general purpose computer that issues digital certificates certifying the ownership of a public key by the named subject of the certificate, allowing others to trust that the private key corresponding to the public key belongs to the named subject. A digital certificate includes information about the public key, information about the owner's identity, and the digital signature of certificate authority 70 that has verified that the certificate's contents are correct.

Active directory domain server 80, sometimes referred to as domain controller 80, is a general purpose computer that provides directory-based identity-related services, including authenticating and authorizing all users and computers in a Windows domain type network, assigning and enforcing security policies for all computers in the network, and installing or updating software.

In some embodiments, credentials registrar 60 includes the functions of certificate authority 70. In other embodiments, domain controller 80 includes the functions of certificate authority 70.

Set-Up

FIGS. 2A-2B and 3A-3B are a flowchart showing a set-up procedure for a new user. During set-up, data from the new user's smart card (not shown) is transferred to controller 50. A management credential (MC) is created, encrypted and stored in mobile device 10. Using the MC, a secure channel is established between mobile device 10 and controller 50. Then, for each of the t derived credentials that the user of mobile device 10 needs for various purposes such as access and authorization for applications executing at one or more hosts, a cryptographically related key pair, comprising a public key and a private key, is generated at mobile device 10. The private key is split into two kibbles; one encrypted kibble is stored at mobile device 10 and the other encrypted kibble is stored at controller 50. Based on the t public keys, t corresponding security certificates, referred to as derived credentials (DC), are obtained and stored in mobile device 10, controller 50 and active domain directory server 80.

Figure 2A:
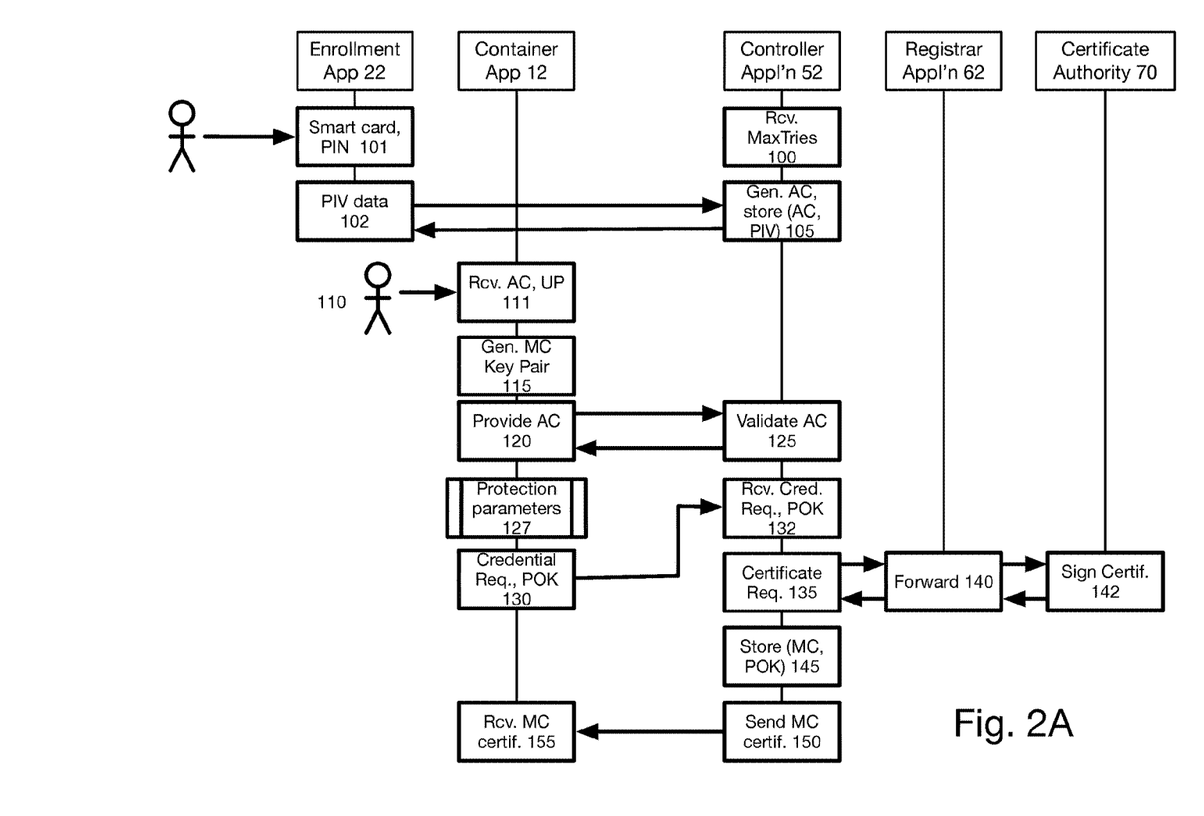
FIGS. 2A-2B and 3A-3C are a flowchart showing a set-up procedure and a variation.

At step 100 of FIG. 2A, controller application 52 receives and stores a value for a parameter MaxTries specifying how many erroneous attempts at supplying a correct user password are permitted. After the MaxTries number of erroneous attempts occurs, controller 50 blocks further attempts and the user of mobile device 10 must request assistance from a system administrator, as discussed below with respect to FIG. 4B step 459. The value for MaxTries is provided by an administrator of controller 50. In some embodiments, the value MaxTries is provided by an administrator of host server 40, so different instances of host server 40 may have different values for MaxTries. In certain embodiments, instead of merely blocking after MaxTries serial erroneous attempts, other techniques are employed, such as blocking for a predetermined long time—such as an hour or a day—after the MaxTries number of unsuccessful attempts, and so on.

At step 101, a user presents his/her smart card to card reader 24, which reads the personal identity verification (PIV) information from the card and provides it to enrollment application 22, along with a smart card PIN or some form of biometric authentication such as a fingerprint, iris or voice sample presented to desktop device 20. In some embodiments, step 101 is performed in person before an authorized credential issuance authority, the user simply provides a smart card, and the authority provides authentication to enrollment application 22. A PIV card is government-issued ID and includes a photograph of the user.

At step 102, enrollment application 22 encrypts the PIV data using the public security certificate of controller 50, and sends the encrypted PIV data to controller application 52 via communication network 30.

At step 105, controller application 52 receives, decrypts, and stores the PIV data, then generates an activation code (AC), stores the AC in association with the PIV data, and returns the AC to enrollment application 22. The AC is used during set-up as a way for controller application 52 to associate a new mobile device user with PIV data stored at controller 50. In other embodiments, different techniques are used. For example, in another embodiment, controller application 52 requires the new user to manually enter at least some of the PIV data, and, only if the entered PIV data matches the stored PIV data, does controller application 52 associate the user with the stored PIV data.

At step 110, the user of remote device 10 provides the received AC to container app 12, along with his or her user password (UP).

At step 111, container app 12 receives the AC and UP, and retains the AC and UP in the memory of mobile device 10, but does not store the AC and UP. Container app 12 retains the AC only long enough to use the AC at step 120, discussed below, then discards the AC. Container app 12 retains the UP only long enough to use the UP at step 185, discussed below, then discards the UP. Omitting storage of the UP in mobile device 10, and everywhere else depicted in FIG. 1, is a significant security feature of the present invention.

At step 115, container app 12 generates a public and private key pair for the management credentials (MC):

MC_public, MC_private, according to Public-Key Cryptography Standards (PKCS) #1, version 2.2, published by RSA Laboratories. In one embodiment, each of the public and private keys is 2048 bits in length. Container app 12 does not yet store the public and private keys.

At step 120, container app 12 encrypts the AC using the public security certificate of controller 50, and provides the encrypted AC to controller application 52 via communication network 30.

At step 125, controller application 52 receives the encrypted AC, decrypts the encrypted AC to recover the AC, and validates the AC by checking whether the newly received AC matches any of the ACs stored at controller 50; if there is a match, then the AC is validated. After a stored AC matches a received AC, controller application 52 deletes the stored AC.

At step 127, container app 12 calculates protection parameters MCEK, POK and DCEK.

Figure 3A:
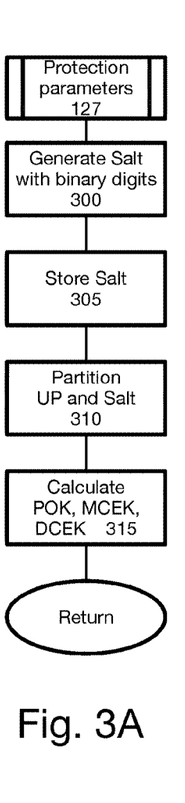

Turning to FIG. 3A, at step 300, container app 12 generates a salt S, having the same length as the user password UP stored at step 111. Salt S has ASCII characters, is randomly generated, and is used in similar manner as a mask. Technically, a salt is a string used by a function, while a mask is a number used by an operator. The purpose of salt S is to add diversity, so that if two users associated with respective instances of mobile device 10 happen to choose the same password, the values stored in their respective instances of mobile device 10 will be different, making it harder for an attacker to compromise security.

At step 305, container app 12 stores salt S in mobile device 10.

At step 310, container app 12 partitions the user password UP into three parts UPa, UPb and UPc, and partitions the salt S into three parts Sa, Sb and Sc.

One technique for partitioning UP is to define UPa as the first half of UP, UPb as the second half of UP, and UPc is the even characters of UP.

One technique for partitioning S is to define Sa as the first half of S, Sb as the second half of S, and Sc as the odd characters of S.

For example, assume the user password is UP=Shakes0peare!, and the salt is S=qxyz12345pr789. Then, UPa=Shakes0, UPb=peare!, UPc=hkspae, Sa=qxyz123, Sb=45pr789, and Sc=qy135r8.

At step 315, container app 12 calculates the protection parameters:

MCEK=PBKDF2 (Sa, UPa)
DCEK=PBKDF2 (Sb, UPb)
POK=PBKDF2 (Sc, UPc)

PBKDF2 is a key derivation function described in IETF RFC 2898 PKCS#5, available at tools.ietf.org/html/rfc2898.

The protection parameters are an elaborate technique that prevents an attacker from knowing the UP even if the attacker obtains the values stored in mobile device 10 or controller 50. Merely using random numbers would require storing the random numbers, which makes them available to an attacker who has mobile device 10. Using UP directly is undesirable because a user password usually comprises printable characters that limit the domain space and increase the chance of success for a brute force attack.

At step 130, container app 12 prepares and sends a credential request, including the public key MC_public, and POK, to controller application 52. Container app 12 then discards the POK, that is, the POK is not stored in mobile device 10. The management credential certificate request is:

P 10_MC=PKCS10(MC_public, MC_private)

according to Certification Request Standard PKCS10, devised by RSA Security, Inc, published as Internet Engineering Task Force (IETF) RFC 2986, updated by IETF RFC 5967, available at tools.ietf.org/html/rfc5967. In other embodiments, instead of PKCS10, a different cryptographic key function is used.

At step 132, controller application 52 receives the management credential request P 10_MC and POK.

At step 135, in response to the management credential request P 10_MC, controller application 52 uses the stored PIV data associated with the AC to prepare a new certificate request including the public key MC_public, encrypts the certificate request using the public security certificate of controller 50, and sends the encrypted certificate request to registrar application 62 via communication network 30.

At step 140, registrar application 62 receives the certificate request and forwards it to certificate authority 70.

At step 142, certificate authority 70 generates and signs a new security certificate and sends it to registrar application 62, which forwards the new security certificate to controller application 52.

At step 145, controller application 52 stores the new security certificate, referred to as the management credential (MC) security certificate, and the POK, in association with the stored PIV data.

At step 150, controller application 52 sends the MC security certificate to container app 12 via communication network 30.

At step 155, container app 12 receives the MC security certificate.

Figure 2B:
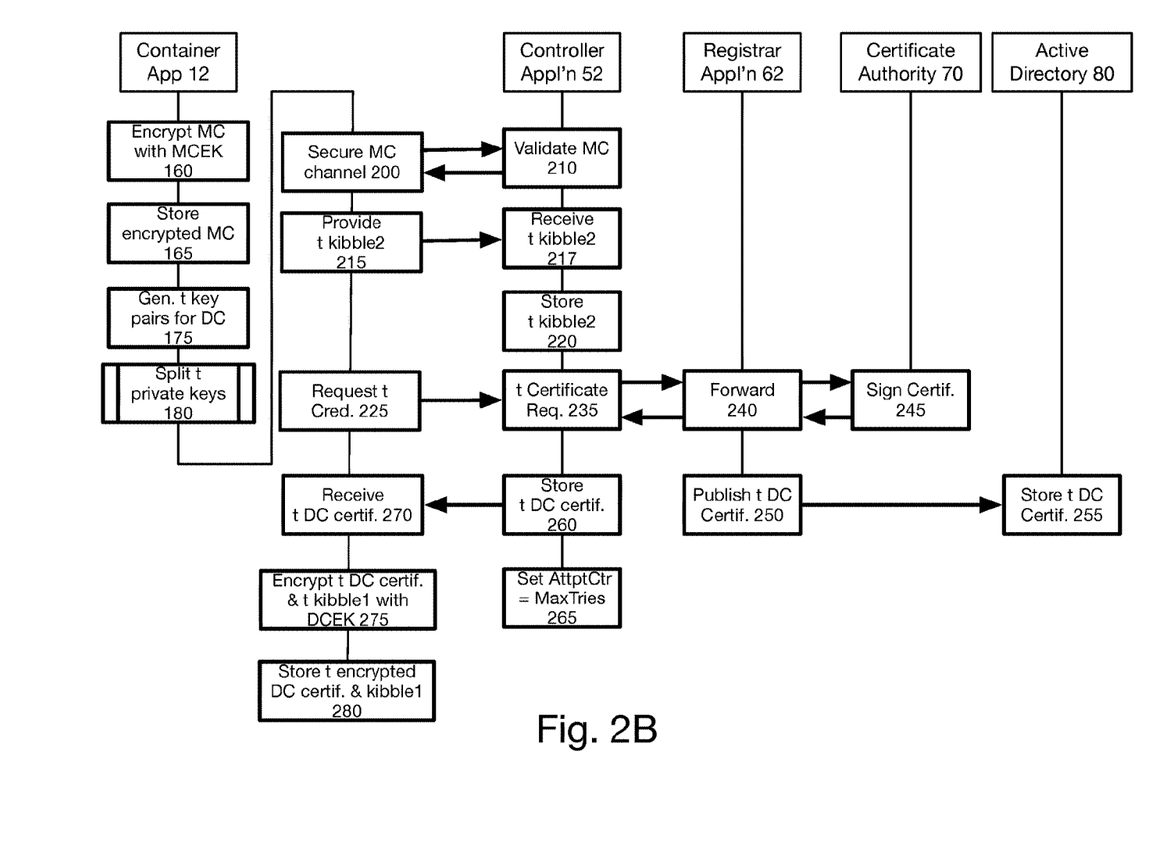

Turning to FIG. 2B, at step 160, container app 12 encrypts the MC—both the MC security certificate and the MC private key—using the MCEK generated at step 127, and discards the MCEK. Container app 12 keeps the unencrypted MC security certificate for use at step 200.

At step 165, container app 12 stores the encrypted MC in mobile device 10. Storing the MC to in encrypted form makes it harder for an attacker to attack, because the attacker has to calculate MCEK from UP. Container app 12 is now provisioned with the MC, so container app 12 can create a secure channel between mobile device 10 and controller 50.

Creation of derived credentials (DC) will now be discussed.

DC can be used for email signing, for authentication at different websites, for Windows log-in, and so on as desired by enterprise information technology administrators.

At step 175, container app 12 obtains a value for t and generates t new key pairs, where t is the number of different derived credentials (DC) that the user needs:

DCn_public, DCn_private, where n=1 . . . t

In one embodiment, each private key DCn_private has a length of 2048 bits. In one embodiment, t is a predetermined number such as 10. In another embodiment, container app 12 asks the user how many credentials it should create. In a further embodiment, container app 12 determines tin cooperation with host app(s) 14. In yet another embodiment, controller application 52 provides a value for t at step 150, as set by an enterprise information technology administrator.

At step 180, container app 12 splits each of the respective DC private keys into two parts, referred to as kibbles. One DC kibble will be stored in mobile device 10, while the other DC kibble will be stored in controller 50. The splitting occurs in a reversible manner, so that the DC private key can be recovered.

In one embodiment, the DC private key splitting occur by setting kibble1 as the first half of DCn_private, and setting kibble1 as the second half of DCn_private. A problem with splitting in such a simple technique is that an attacker can perform an exhaustive search for the second half of the DC private key, possibly quickly enough to be effective. For instance, if a 2048 bit key is evenly split into two parts, then an attacker must search $2^{1024}$ combinations, instead of $2^{2048}$ combinations. This situation is referred to as the "reduced complexity problem".

Figure 3B:
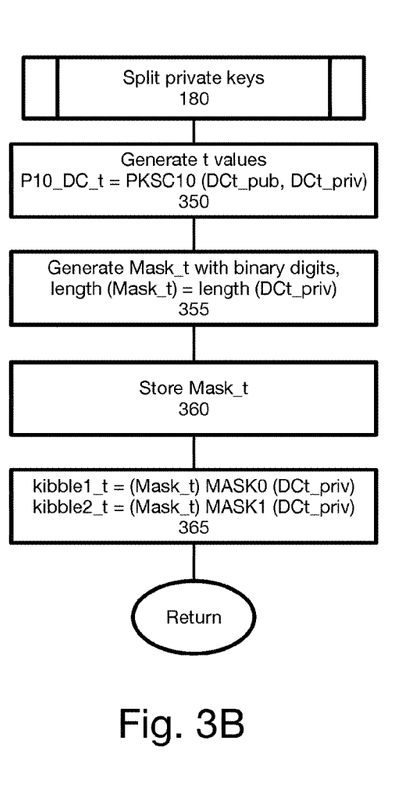

In another embodiment, the private key splitting occurs as shown in FIG. 3B so that the full length of the DC private key determines what an attacker must find, not merely part of the length of the DC private key.

Turning to FIG. 3B, at step 350, container app 12 generates t certificate requests:

P 10_DC_n=PKCS 10 (DCn_public, DCn_private), where n=1 . . . t

Each credential request P $10_{13}$ DC_n is determined according to PKCS 10, discussed at step 135.

At step 355, container app 12 generates binary mask values Mask_n, where n=1 . . . t, and the length of each Mask_n is equal to the length of DKn_private. The purpose of the mask is to increase the difficulty to an attacker: in addition to determining the value of the bits of the private key, the attacker must also determine the placement of the bits in the full key. In some embodiments, only one Mask is generated, and this Mask is used in splitting all of the private keys.

At step 360, container app 12 stores the mask values Mask_n, where n=1 . . . t. It is recognized that storing the mask is undesirable, as an attacker who obtains the mask has achieved the reduced complexity problem.

At step 365, container app 12 uses the mask values to divide the cryptographic credential values into two parts:

kibble1_n=(Mask_n) MASK0 (DCn_private)
kibble2_n=(Mask_n_ MASK1 (DCn_private)

where n=1 . . . t, MASK0 selects the digits of DCn_private indicated by the 0 values of Mask_n, and MASK1 selects the digits of DCn_private indicated by the 1 values of Mask_n. Knowledge of the mask values enables the divided cryptographic credential values to be recombined to produce the original cryptographic credential values.

For example, assume that each DC private key has a length of 6 bits, instead of the actual length such as 2048 bits stated at step 175. Assume that a DC private key is DCn_private=110110, and that a mask is Mask_n=101010. The first kibble is the digits of the cryptographic credential indicated by the 0 values of the mask, indicated as the MASK0 operator, while the second kibble is the digits of the cryptographic credential indicated by the 1 values of the mask, indicated as the MASK1 operator:

kibble1=(101010) MASK0 (110110)=110 kibble2=(101010) MASK1 (110110)=101

The mask Mask_n has zero in its second, fourth and sixth bits, so kibble1 is the second, fourth and sixth bits of the DC private key DCn_private: 110. The mask Mask_n has one in its first, third and fifth bits, so kibble1 is the first, third and fifth bits of the DC private key DCn_private: 101.

The original cryptographic credential can be easily recovered, at FIG. 5B step 675, discussed below, by masking together its two kibbles, using the Mask to select the order of combining the digits of the kibbles, indicated by the function MASK+:

DCn_private=MASK+(Mask, kibble1, kibble2)=MASK+ (101010,110,101)=110110

In our example:

(a) the first Mask digit is 1, so the first digit of kibble2 is selected: 1, (b) the next Mask digit is 0, so the first digit of kibble1 is selected: 1, (c) the next Mask digit is 1, so the next digit of kibble2 is selected: 0, (d) the next Mask digit is 0, so the next digit of kibble1 is selected: 1, (e) the next Mask digit is 1, so the next digit of kibble2 is selected: 1, (f) the next Mask digit is 0, so the next digit of kibble1 is selected: .

Returning to FIG. 2B, at step 200, container app 12 uses the retained unencrypted MC received at step 155, and the MC private key created at step 115, to create a secure connection to controller application 52 via communication network 30.

At step 210, controller application 52 validates the MC by checking whether the newly received MC matches any of its stored MCs; if so, the newly received MC is validated. and controller application 52 acknowledges to container app 12 that a secure connection exists.

At step 215, container app 12 provides its t private key kibble2 to controller application 52.

At step 217, controller application 52 receives the t private key kibble2.

At step 220, controller application 52 stores the t private key kibble2 in association with the stored PIV data and associated POK and MC for the user of mobile device 10.

At step 225, container app 12 sends t credential requests P 10_DC_n to controllerapplication 52 for a derived credential (DC) for each of the t derived credential public keys DKn_public.

At step 235, in response to the credential requests P 10_DC_n, controller application 52 uses the stored PIV data to prepare t new certificate requests respectively including the t public keys DKn_public, encrypts the certificate requests using the public security certificate of controller 50, and sends the certificate requests to registrar application 62 via communication network 30.

At step 240, registrar application 62 receives the certificate requests and forwards them to certificate authority 70.

At step 245, certificate authority 70 generates and signs t new security certificates, each of which is referred to as a derived credentials (DC) security certificate, and sends them to registrar application 62, which forwards the t new DC security certificates to controller application 52.

At step 250, registrar application 62 sends the t new DC security certificates to active directory domain server 80 using communication network 30.

At step 255, active directory domain server 80 stores the new DC security certificates. At step 490, discussed below, when host server application 42 executing in host server 40 wants to securely communicate with host app 14 executing in mobile device 10, host server application 42 retrieves the correct DC security certificate from active directory domain server 80 to authenticate the user of mobile device 10.

At step 260, controller application 52 stores the t DC security certificates in association with the other stored data for the user of mobile device 10, and sends the t DC security certificates to container app 12 via the channel encrypted with MC. In some embodiments, step 250 is omitted and instead, at step 260, controller application 52 publishes the t DC security certificates to active directory domain 80.

At step 265, controller application 52 sets a new counter, AttemptsCtr, to the value MaxTries provided at step 100, and stores AttemptsCtr in association with the PIV data. In this embodiment, there is only one AttemptsCtr for all of the t DC in mobile device 10, so that if a user incorrectly enters the password for one of the DC for MaxTries attempts, all of the DC are blocked. In other embodiments (not shown), there are t AttemptsCtr respectively associated with each of the t DC, so that a user can be blocked from DC for one host, yet still be able to try to use DC with another host.

At step 270, container app 12 receives the t DC security certificates.

At step 275, container app 12 encrypts the t DC security certificates, and the t kibble1 from step 180, using the DCEK calculated at step 127.

At step 280, container app 12 stores the t encrypted DC security certificates, and the associated encrypted t kibble1, in mobile device 10. The DCEK is not stored in mobile device 10, to make it harder for an attacker to recover the DC. Container app 12 is now provisioned with the DC security certificates and their associated private key kibble1. The associated private key kibble2 are not stored in mobile device 10, so the t DC private keys are not available to an attacker who obtains mobile device 10 yet lacks the correct user password, similar to the protection provided by a physical smart card.

Operation

FIGS. 4A-4C and 5A-5B are a flowchart showing an operational procedure enabling a user of mobile device 10 to securely access host server application 42. A user of mobile device 10 selects a host app 14, and provides his or her user password (UP). Host app 14 provides the UP to container app 12, and requests a particular derived credentials (DC). Container app 12 establishes a secure channel with controller application 52, calculates a POK based on the received UP, and provides the POK and a request for a particular kibble2 to controller application 52. At container application 52, if the received POK matches a stored POK, then the requested kibble2 is provided to container app 12, which uses kibble2 to generate the requested DC and provide to host app 12. But, if the received POK does not match the stored POK, controller application 52 allows a predetermined number of additional attempts to provide the correct POK, corresponding to providing the correct UP, then denies access, thus preventing a brute force attempt by the user of mobile device 10 to guess the correct UP.

Figure 4A:
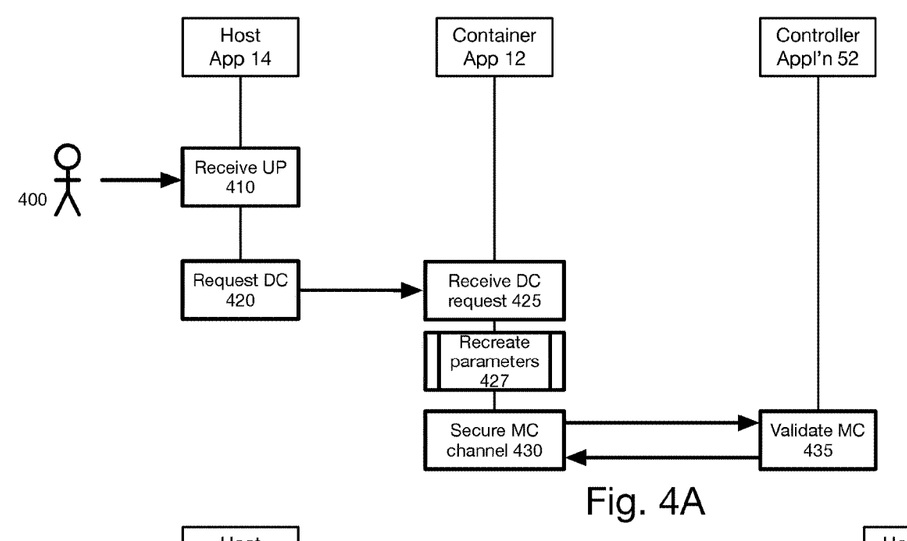
FIGS. 4A-4C and 5A-5C are a flowchart showing an operational procedure wherein container app 12 provides a first embodiment of an application programming interface (API), and a variation.

At step 400 of FIG. 4A, the user of mobile device 10 provides a UP.

At step 410, host app 14 executing in mobile device 10 receives the UP.

At step 420, host app 14 requests from container app 12 the one of the t DCs appropriate for use with host server application 42. The DC request from host app 14 includes the user password received at step 410.

At step 425, container app 12 receives the DC request from host app 14. Container app 12 provides a container API according to the operating system of mobile device 10, such as Applie IOS or Google Android. In pseudo-code, the API comprises the function:

ErrorCode getDerivedPIVCredential (In String UserPassword,
 In String DCIdentifier,
 Out Blob DC)

where UserPassword is the password just received from the user of mobile device 10, DCIdentifier identifies which of the t DC is desired, and DC are the derived credentials provided by container app 12 includes a DC security certificate with the DC public key, and an associated DC private key.

At step 427, container app 12 recreates the parameters POK, MCEK and DCEK, based on the UP received at step 410.

Figure 5A:
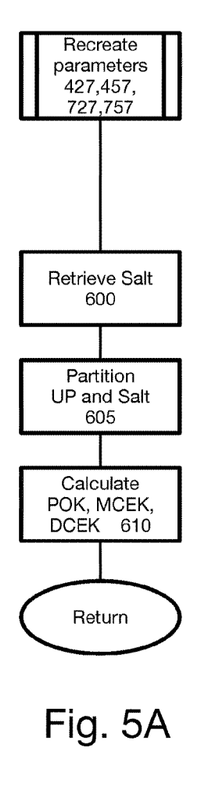

Turning to FIG. 5A, at step 600, container app 12 retrieves salt S stored at step 305.

At step 605, container app 12 partitions UP and S, as described at step 310.

At step 610, container app 12 calculates POK, MCEK and DCEK, as described at step 315.

Returning to FIG. 4A, at step 430, container app 12 retrieves the encrypted MC stored at step 165, decrypts using the MCEK calculated at step 427 based on the newly entered password, and creates a secure connection to controller application 52 via communication network 30 using the management credential MC, as described at step 200.

At step 435, controller application 52 validates the MC as described at step 210, and acknowledges to container app 12 that a secure connection exists.

Figure 4B:
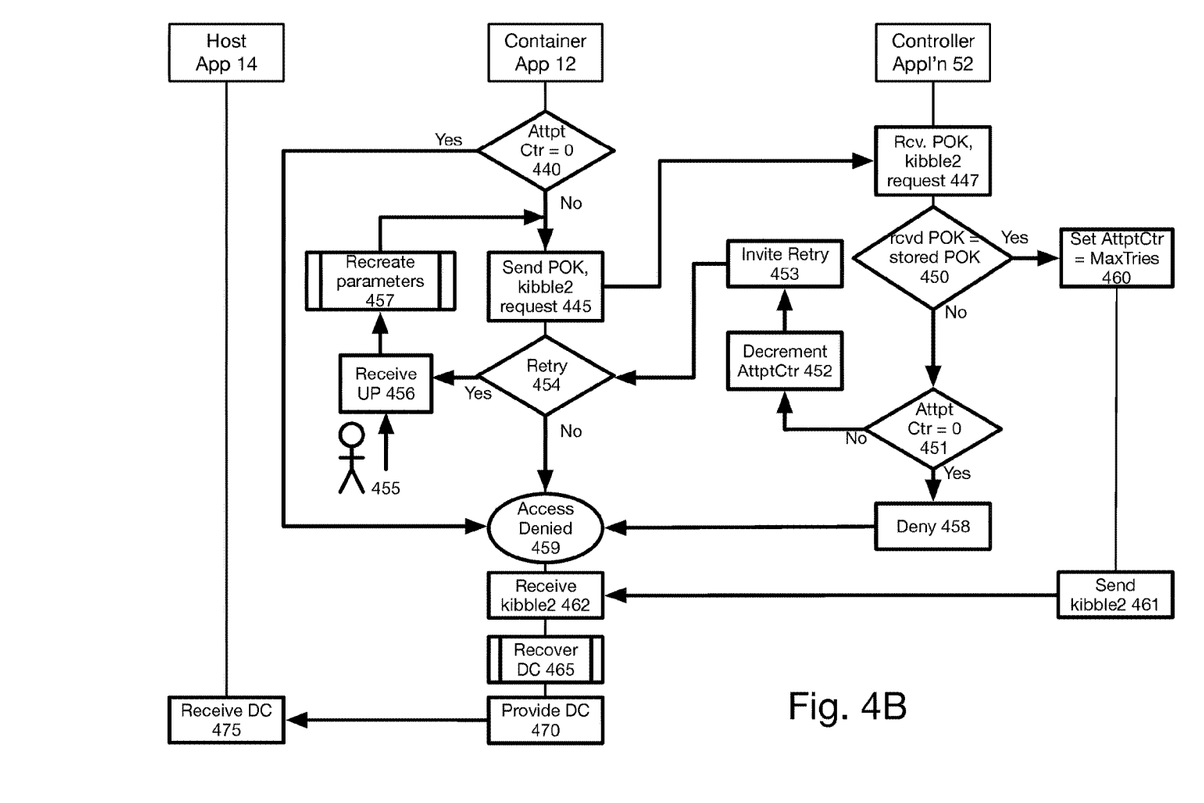

Turning to FIG. 4B, at step 440, container app 12 checks whether the maximum number of permitted password entry attempts MaxTries has occurred, that is, whether the AttemptsCtr value is zero. If so, the user is not permitted to use the DC, and processing continues at step 459. If not, that is, the user is permitted to attempt to use the DC, processing continues at step 445.

At step 445, container app 12 provides the just calculated POK to controller application 52, based on the user password received at step 410, and requests private key kibble2 for the DC indicated at step 420.

At step 447, controller application 52 receives the POK and request for kibble2.

At step 450, controller application 52 compares the received POK with its stored POK. If there is no match, processing continues at step 451. If there is a match, then the correct user password UP was provided by the user of mobile device 10. Processing proceeds to step 460, where controller application 52 sets the counter AttemptsCtr to the value MaxTries, and at step 461, controller application 52 retrieves and sends kibble2 to container app 12.

At step 462, container app 12 receives kibble2. At step 465, container app 12 recovers the appropriate derived credential DC security certificate, as shown in FIG. 5B.

Figure 5B:
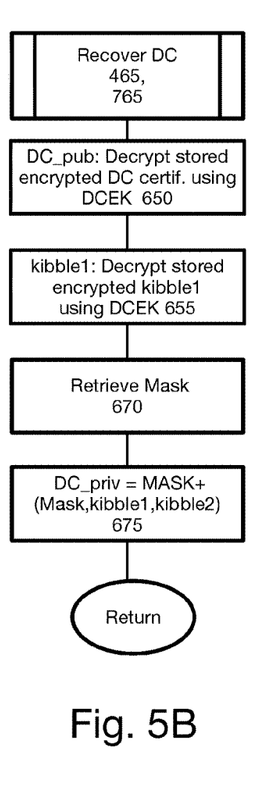

At step 650 of FIG. 5B, container app 12 obtains the DC public key DCn_public by decrypting the encrypted DC, stored at step 280, using the DCEK obtained at step 427 (or, if this is a second or subsequent access attempt, the DCEK obtained at step 525).

At step 655, container app 12 obtains kibble1 of the DC private key by decrypting the encrypted kibble1 stored at step 280, using the DCEK obtained at step 427 (or at step 457).

At step 670, container app 12 retrieves the correct Mask, stored at step 360.

At step 675, container app 12 uses the Mask to combine kibble1 and kibble2 to recover the nth DC private key DCn_private for host server application 42, as explained at step 365.

Returning to FIG. 4B, at step 470, container app 12 provides to host app 14 the just recovered derived credential public and private keys DKn_public and DKn_private, and the decrypted DC obtained at step 650.

At step 475, host app 14 has the correct derived credentials for communicating with host server application 42.

Figure 4C:
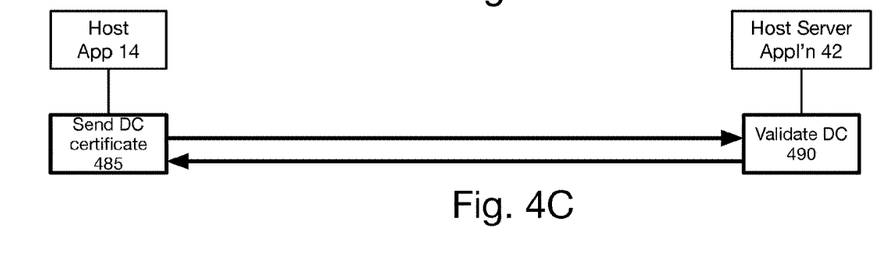

Turning to FIG. 4C, at step 485, host app 14 sends its DC public key to host server application 42. At step 490, host server application 42 validates the received DC public key by comparing the received DC public key with the DC public key stored in active domain directory server 80 at step 255; if there is a match, host server application 42 determines that the received DC public key is valid. The user of mobile device 10 now has obtained access to use host server application 42.

At step 451 of FIG. 4B, controller application 52 has determined that the user of mobile device 10 failed to enter the correct user password. Controller application 52 checks whether the maximum number of permitted password entry attempts MaxTries has occurred, that is, whether the AttemptsCtr value is zero. If so, processing continues at step 458.

At step 452, when the maximum number of permitted password entry attempts has not occurred, container application 52 decrements the value of AttemptsCtr, indicating a failed entry attempt has occurred. At step 453, controller application 52 sends an invitation to container app 12 to retry, that is, to provide a new POK.

At step 454, container app 12 receives the invitation to retry, and invites the user of mobile device 10 to try again to enter the user password UP. If the user declines, then at step 459, discussed below, container app 12 denies access to host server application 42 to the user of mobile device 10.

If, at step 455, the user enters another user password, then at step 456, container app 12 receives the user password. At step 457, container app 12 recreates the parameters POK and DCEK based on the newly received UP by executing the steps of FIG. 5B, described above at step 427. Processing continues at step 445, described above.

At step 458, the maximum number of permitted incorrect password entry attempts has occurred. Controller application 52 sends a message to container app 12, denying access. At step 459, container app 12 denies access to host server application 42 to the user of mobile device 10. The user of mobile device 10 must request assistance from the system administrator of controller 50, so that mobile device 10 can be provisioned with new DC, or controller 50 can have its stored value for the attempts counter associated with mobile device 10 manually set to a non-zero value.

Thus, the smart card function of blocking after a predetermined number of incorrect password entry attempts is replicated, although the smart card itself is not used.

In some embodiments, when controller application 52 denies access to container app 12, controller application 52 also sends an alert to the enterprise information technology administrator, to check whether mobile device 10 is in the possession of an authorized user.

The enterprise information technology administrator chooses a procedure for how the user gets access to host server application 42 after a predetermined number of failed password entry attempts. In one embodiment, the user must enroll again, starting at FIG. 2A step 100. In another embodiment, the enterprise information technology administrator can reset the counter AttemptsCtr for that user, at controller 50, to a non-zero value.

A variation of the set-up and operational procedures will now be described with reference to FIGS. 3C and 5C. As noted at step 360 above, storing the mask is undesirable. In this variation, the mask is not stored. Instead, the private key is split into kibbles using a random binary number and its logical complement, ensuring full difficulty for an attacker, and then the kibbles are combined so that the random number and its inverse are cancelled, resulting in the private key. Importantly, the random binary number and its inverse are discarded immediately after use, so an attacker cannot obtain them.

In the Boolean Algebra discussed below, the bit-wise operations, BIT-NEG (arg1), BIT-AND (arg1, arg2) and BIT-OR (arg1, arg2) are used. These operations are defined in Tables 3-5 and are performed on each bit independently, that is, no carries during addition.

TABLE 3

| arg1 | BIT-NEG (arg1, arg2) |
|---|---|
| 0 | 1 |
| 1 | 0 |

TABLE 4

| arg1 | arg2 | BIT-AND (arg1, arg2) |
|---|---|---|
| 0 | 0 | 0 |
| 0 | 1 | 0 |
| 1 | 0 | 0 |
| 1 | 1 | 1 |

TABLE 5

| arg1 | arg2 | BIT-OR (arg1, arg2) |
|---|---|---|
| 0 | 0 | 0 |
| 0 | 1 | 1 |
| 1 | 0 | 1 |
| 1 | 1 | 1 |

Figure 3C:
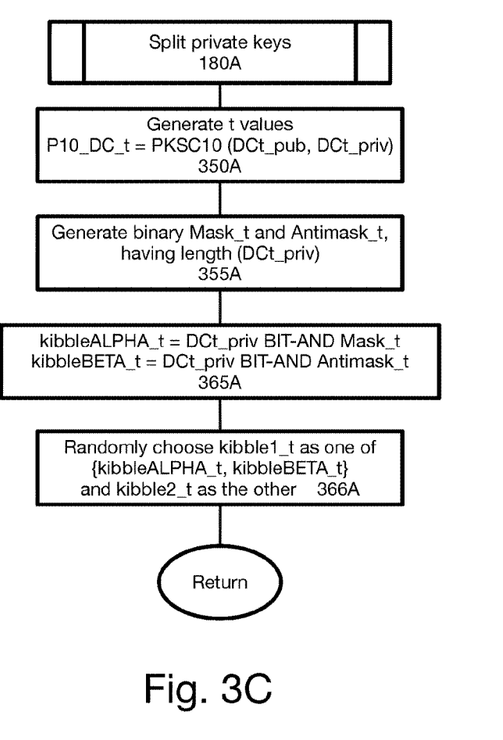

During set-up, instead of private key splitting as in FIG. 3B, private key splitting occurs as in FIG. 3C. Turning to FIG. 3C, step 350A is identical to step 350 of FIG. 3C.

At step 355A, container app 12 obtains a mask M as in step 355, and also obtains an antimask AM as the inverse of M, i.e., the bit-wise negation of M:
 AM=BIT-NEG (M)

At step 365A, container app 12 calculates kibbleALPHA as the bit-wise AND of the DC private key and the mask M, and calculates kibbleBETA as the bit-wise AND of the DC private key and the antimask AM:
 kibbleALPHA_t=(DCt_priv) BIT-AND (Mask_t)
 kibbleBETA_t=(DCt_priv) BIT-AND (Antimask_t)
Container app 12 then discards mask M and antimask AM.

At step 366A, container app 12 randomly chooses which of kibbleALPHA and kibbleBETA will be stored in mobile device 10 as kibble1_t, while the other is sent to controller 50 as kibble2_t.

Figure 5C:
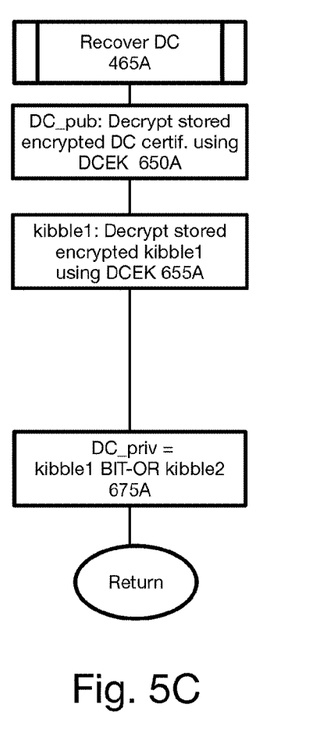

During operation, instead of private key recovery as in FIG. 5B, private key recover occurs as in FIG. 5C. Turning to FIG. 5C, steps 650A and 655A are respectively identical to steps 650 and 655 of FIG. 5C.

At step 675A, the DC private key is recovered by a bit-wise OR of the stored kibble1 and kibble2 received from controller 50:
 DC_priv=(kibble1) BIT-OR (kibble2)
For example, during set-up, let the private key be 010101 and the randomly chosen mask M be 111000.
Then
 antimask AM=BIT-NEG (111000)=000111
 kibbleALPHA=(010101) BIT-AND (111000)=010000
 kibbleBETA=(010101) BIT-AND (000111)=000101
Let the random choice be that kibbleALPHA is sent to controller 50, then:
 kibble1=kibbleBETA=000101
 kibble2=kibbleALPHA=010000
Then, during operation:
 DC-priv=(kibble1) BIT-OR (kibble2)=(000101) BIT-OR (010000)=010101
Since the operations are bit-wise and binary, Table 6 is a proof that the recovered key is the original key.

TABLE 6

| Indepedent Inputs | | Antimask | Kibble1 (Private key) | Kibble2 (Private key) | Recovered key Kibble1 |
|---|---|---|---|---|---|
| Private key | Mask | BIT-NEG (Mask) | BIT-AND (Mask) | BIT-AND (Antimask) | BIT-OR Kibble1 |
| 0 | 0 | 1 | 0 | 0 | 0 |
| 0 | 1 | 0 | 0 | 0 | 0 |
| 1 | 0 | 1 | 0 | 1 | 1 |
| 1 | 1 | 0 | 1 | 0 | 1 |

Figure 6A:
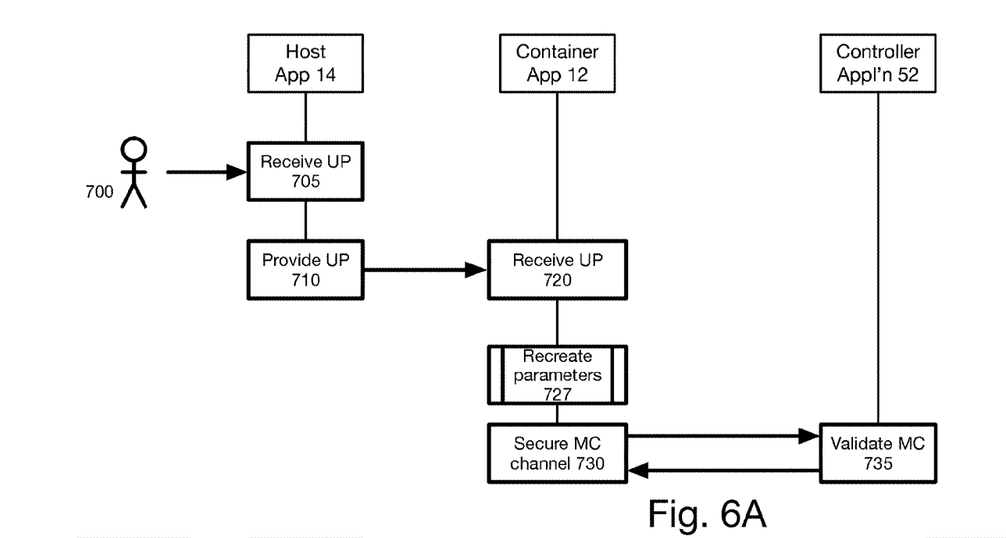
FIGS. 6A-6C are a flowchart showing an operational procedure wherein container app 12 provides a second embodiment of an application programming interface (API).
Figure 6B:
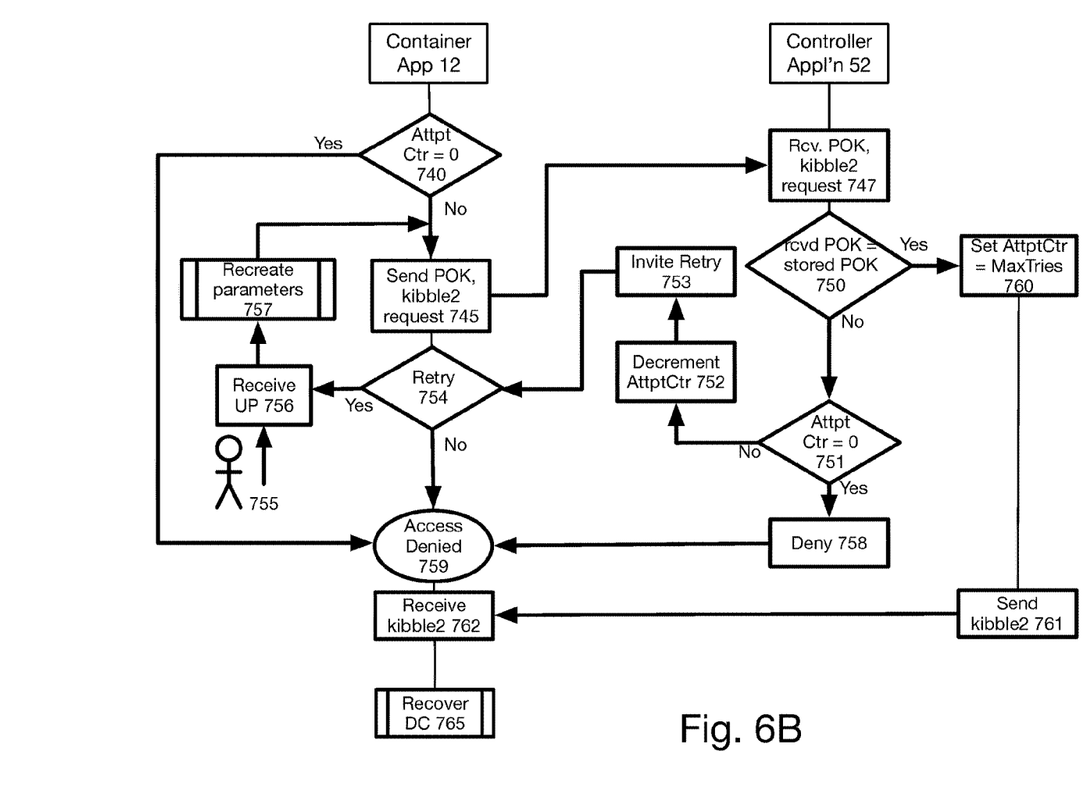
Figure 6C:
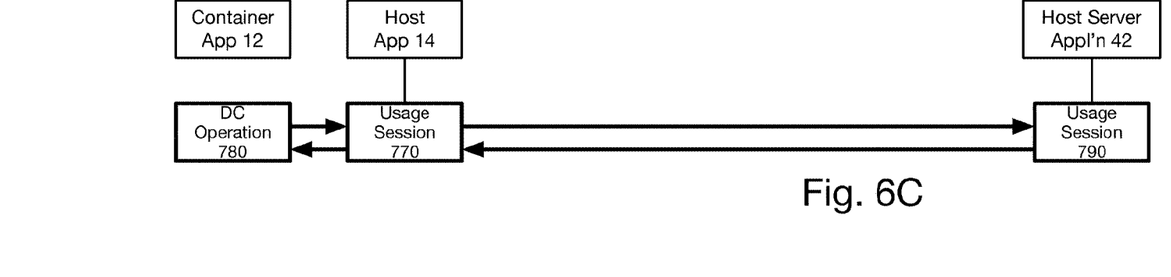

FIGS. 6A-6C are a flowchart showing an operational procedure wherein container app 12 provides a second embodiment of an API. The API operates with application protocol data units (APDUs) according to ISO/IEC 7816-4, available at www.iso.org/iso/home/store/catalogue_ics/catalogue_detail_ics.htm?csnumber=54550. In pseudo-code, the API comprises two functions:
 ErrorCode signMessage (In String UnsignedMessage,
  In String DCIdentifier,
  Out String SignedMessage)
 ErrorCode decryptMessage (In String CipherMessage,
  In String DCIdentifier,
  Out String CleartextMessage)
where DCIdentifier identifies which of the t DC is desired, UnsignedMessage is a cleartext message that host app 14 wishes to send to host server 40, SignedMessage is a digitally signed version of the cleartext message signed by container app 12 using the DC selected by DCIdentifier, CipherMessage is an encrypted message from host server 40 that needs to be decrypted so it can be used by host app 14, and CleartextMessage is the decrupted version of the encrypted message from host server 40 as decrypted by container app 12 using the DC selected by DCIdentifier.

Turning to FIG. 6A, steps 700 and 705 of FIG. 6A correspond to steps 400 and 410 of FIG. 4A, and are not discussed for brevity.

At step 710, host app 14 provides the user password received at step 705 to container app 12, along with a selection of which of the t DC that host app 14 wishes to use.

At step 720, container app 12 receives the user password and DC selection from host app 14.

Steps 727, 730, 735 of FIG. 6A correspond to steps 427, 430, 435 of FIG. 4A.

Turning to FIG. 6B, steps 740-765 correspond to steps 440-465 of FIG. 4B. However, FIG. 6B lacks steps corresponding to steps 470-475 of FIG. 4B, that is, in this embodiment, container app 12 does not provide the DC to host app 14.

Turning to FIG. 6C, at step 770, host app 14 conducts, on behalf of the user of mobile device 10, a usage session with host server application 42. The usage session comprises sending encrypted messages to host server application 42 and receiving encrypted messages from host server application 42. To encrypt its own cleartext message, host app 14 provides its cleartext message to container app 12 and receives therefrom an encrypted version of its message. To decrypt a message from host server application 42, host app 14 provides the encrypted message to container app 12 and receives therefrom a decrypted version of the message from host server application 42. Typically, information in the decrypted message from host server application is displayed to the user of mobile device 10, or stored in mobile device 10.

At step 780, container app 12 encrypts and decrypts messages for host app 14, in a conventional encryption/decryption process using the selected DC recovered at step 765, as described at step 770.

At step 790, host server application 42 conducts a usage session with host app 14, as described at step 770. Host server application 42 obtains the DC certificate, including a public key, from active directory domain 80.

In some embodiments, the DC private key is stored in encrypted form in mobile device 10, the DC private key kibbles technique is not used, and at FIG. 4B step 461, controller application 52 sends a usage authorization to container app 12, instead of sending kibble2. Container app 12 requires a derived credentials usage authorization from controller 50 before it uses the stored DC in mobile device 10. It is recognized that these embodiments are less secure than the embodiments using the DC private key kibbles technique.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of obtaining access to a host server, comprising: at a mobile device,
   sending to a controller via a communication network, a proof of knowledge based on a password received from a user;
   receiving a kibble from the controller,
   using the received kibble, and a kibble stored at the mobile device, to recover a private key of derived credentials by performing a bit-wise OR operation on the received kibble and the stored kibble based on a mapping of the received kibble and the stored kibble to respective groups of non-contiguous bits in the private key of derived credentials, and
   sending a derived credentials security certificate to the host server via the communication network.

2. The method of claim 1, wherein the controller is at a different location than a location of the host server.

3. The method of claim 1, wherein the mobile device determines the proof of knowledge as a function of a first argument based on a first reversible partition of a salt, and a second argument based on a second reversible partition of the received password.

4. The method of claim 1, further comprising at the mobile device, prior to sending the proof of knowledge to the controller, determining a management credential encryption key based on the received password; using the management credential encryption key to decrypt management credentials stored during a set-up phase; and using the decrypted management credentials to establish a secure channel between the mobile device and the controller.

5. The method of claim 1, wherein the mapping of the received kibble and the stored kibble to the respective groups of non-contiguous bits in the private key of derived credentials is implemented with a mask.

6. The method of claim 1, wherein the mobile device recovers the private key of derived credentials based on information indicating kibble-specific bit placements of the received kibble and the stored kibble within the private key of derived credentials.

7. A controller for improving access security of a host server accessed by a mobile device, comprising:
   a communication interface for using a communication network;
   a storage for storing
      a kibble of a private key of derived credentials, the kibble mapping to a first group of non-contiguous bits in the private key of derived credentials to permit recovery of the private key of derived credentials via a bit-wise OR operation on the kibble and another kibble mapping to a second group of non-contiguous bits in the private key of derived credentials, and
      a proof of knowledge; and
   a processor configured to:
      (a) receive a proof of knowledge from the mobile device via the communication network,
      (b) check whether the received proof of knowledge matches the stored proof of knowledge,
      (c) when a match occurs, send the kibble to the mobile device via the communication network,
      (d) when a match does not occur:
         (1) check whether the access attempts threshold has been reached by the access attempts counter,
         (2) when the access attempts threshold has been reached, send a message to the mobile device via the communication network denying access, and
         (3) when the access attempts threshold has not been reached, send a message to the mobile device via the communication network inviting sending of a new proof of knowledge.

8. The controller of claim 7, wherein the controller is at a different location than a location of the host server.

9. The controller of claim 7, further comprising before receiving the proof of knowledge from the mobile device, validating that a secure channel exists between the controller and the mobile device.

10. The controller of claim 7, further comprising, during a set-up phase, receiving an original proof of knowledge from the mobile device via the communication network, and storing the original proof of knowledge to create the stored proof of knowledge.

11. The controller of claim 7, further comprising, during a set-up phase, receiving an original kibble from the mobile device via the communication network, and storing the original kibble to create the stored kibble.

12. A mobile device for using a controller to improve access security to a host server, comprising:
- a communication interface for using a communication network;
- a storage for storing
  - a first kibble of a private key of derived credentials;
- a processor configured to:
  - (i) send to the controller via the communication network, a proof of knowledge based on a password received from a user,
  - (ii) receive from the controller via the communication network, a second kibble of the private key of derived credentials,
  - (iii) use the received second kibble and the stored first kibble to recover a private key of the derived credentials by performing a bit-wise OR operation on the received kibble and the stored kibble based on a mapping of the received kibble and the stored kibble to respective groups of non-contiguous bits in the private key of derived credentials, and
  - (iv) send a derived credentials security certificate to the host server via the communication network.

13. The mobile device of claim 12, wherein the controller is at a different location than a location of the host server.

14. The mobile device of claim 12, wherein the proof of knowledge is determined as a function of a first argument based on a first reversible partition of a salt, and a second argument based on a second reversible partition of the received password.

15. The mobile device of claim 12, further comprising, prior to sending the proof of knowledge to the controller, determining a management credential encryption key based on the received password; using the management credential encryption key to decrypt management credentials stored during a set-up phase; and using the decrypted management credentials to establish a secure channel between the mobile device and the controller.

16. The mobile device of claim 12, wherein the private key of the derived credentials is recovered by masking the received second kibble with the stored first kibble.

17. A method of operating a controller, comprising:
- storing a kibble of a private key of derived credentials, the stored kibble mapping to a first group of non-contiguous bits in the private key of derived credentials to permit recovery of the private key of derived credentials via a bit-wise OR operation on the kibble and another kibble mapping to a second group of non-contiguous bits in the private key of derived credentials;
- receiving a proof of knowledge from a mobile device via a communication network;
- checking whether the received proof of knowledge matches a stored proof of knowledge; and
- when a match occurs, sending the stored kibble to the mobile device via the communication network,
- when a match does not occur:
  - (1) checking whether the access attempts threshold has been reached by the access attempts counter,
  - (2) when the access attempts threshold has been reached, sending a message to the mobile device via the communication network denying access, and
  - (3) when the access attempts threshold has not been reached, sending a message to the mobile device via the communication network inviting sending of a new proof of knowledge.

18. The method of claim 17, further comprising at the controller, before receiving the proof of knowledge from the mobile device, validating that a secure channel exists between the controller and the mobile device.

19. The method of claim 17, further comprising at the controller, during a set-up phase, receiving an original proof of knowledge from the mobile device via the communication network, and storing the original proof of knowledge to create the stored proof of knowledge.

20. The method of claim 17, further comprising at the controller, during a set-up phase, receiving an original kibble from the mobile device via the communication network, and storing the original kibble to create the stored kibble.

* * * * *